US008063337B1

(12) United States Patent
Wiederin

(10) Patent No.: US 8,063,337 B1
(45) Date of Patent: Nov. 22, 2011

(54) MASS SPECTROMETRY INJECTION SYSTEM AND APPARATUS

(75) Inventor: Daniel R. Wiederin, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 867 days.

(21) Appl. No.: 11/728,096

(22) Filed: Mar. 23, 2007

(51) Int. Cl.
*B23K 9/00* (2006.01)
*H01J 49/00* (2006.01)
*H01J 7/24* (2006.01)

(52) U.S. Cl. ......... 219/121.52; 219/121.59; 219/121.51; 219/121.43; 250/288; 250/427; 250/423 R; 250/281; 250/287; 315/111.81; 315/111.11; 315/111.51; 315/111.21; 315/111.31

(58) Field of Classification Search ............. 219/121.52, 219/121.59, 121.51, 121.43; 250/288, 427, 250/423 R, 281, 287; 315/111.81, 111.11, 315/111.51, 111.21, 111.31
See application file for complete search history.

(56) References Cited

U.S. PATENT DOCUMENTS

| | | | | |
|---|---|---|---|---|
| 4,859,908 | A * | 8/1989 | Yoshida et al. | 315/111.81 |
| 4,886,966 | A * | 12/1989 | Matsunaga et al. | 250/288 |
| 5,083,004 | A * | 1/1992 | Wells et al. | 219/121.5 |
| 5,272,308 | A * | 12/1993 | Wiederin | 219/121.52 |
| 5,334,834 | A * | 8/1994 | Ito et al. | 250/288 |
| 6,032,876 | A * | 3/2000 | Bertsch et al. | 239/418 |
| 6,106,772 | A * | 8/2000 | Kohler et al. | 422/28 |
| 2006/0226355 | A1* | 10/2006 | Watanabe et al. | 250/294 |

* cited by examiner

*Primary Examiner* — Henry Yuen
*Assistant Examiner* — Ket D Dang
(74) *Attorney, Agent, or Firm* — Advent IP, P.C., L.L.O.

(57) ABSTRACT

An apparatus for use in mass spectrometry comprising an injector body, an injection tube coupled to the injector body, and a shielding assembly disposed between the injector body and the injection tube. The shielding apparatus is suitable for shielding the injector body from heat generated by a plasma source.

18 Claims, 4 Drawing Sheets

MASS SPECTROMETRY INJECTION SYSTEM AND APPARATUS

FIELD OF INVENTION

The present invention relates to analysis using mass spectrometers, and in particular to mass spectrometers utilizing a sample injection method and a plasma source for molecular ionization and disintegration.

BACKGROUND OF THE INVENTION

Mass spectrometers and other systems for chemical and particle analysis are utilized for measurement of the concentration of analytes or the detection and measurement of contaminants and trace additives in solutions and gases. One type of mass spectrometer is an inductively coupled plasma mass spectrometer (ICP-MS). ICPMS is a practical technique for trace and ultratrace elemental analysis. The measurements made by ICP-MS are utilized to determine and manage the quality of process solutions. Ultrapure water (UPW), dilute hydrofluoric acid (HF), and standard industry clean formulations SC1 (Standard Clean 1, ammonium hydroxide and hydrogen peroxide in water) and SC2 (hydrochloric acid and hydrogen peroxide in water) are examples of solutions that are routinely analyzed. Quick and accurate analysis in these and other industrial processes can result in the early detection of contamination problems, better control of process chemistry, and ultimately lead to higher yields and less product variation.

While many advances have been made in instrumentation, the introduction of a sample to the plasma continues to be a problematic area. Specifically, because of elemental quantification requirements and ultimate detection limits in elemental analysis, the collisions that break the molecular species into their elemental or individual atomic components are much more energetic ("harder") through the creation of more highly accelerated ions (with higher energy). For this reason, an inductively coupled plasma (ICP) ionization source is often preferred for molecular ionization and disintegration, due to its ability to completely break molecules into their elemental components. An ICP source works generally by coupling radio frequency (RF) energy into a gas stream containing the nebulized liquid or gas sample with the result that the sample is immediately heated to several thousand degrees. Molecules break apart at these temperatures and collision energies leaving only elemental ions. The plasma source generates a substantial amount of heat within the ICP MS torch during molecular breakdown. The heat generated from the plasma source often causes damage to injectors. Referring to FIG. 1, an injector 100, illustrating an end portion 102 by that has been eroded by exposure to plasma heat is shown. Disadvantageously, this erosion results in unusable injectors, and requires frequent replacement of injector bodies, or injector assemblies.

Therefore, it would be desirable to provide an apparatus which prevented heat erosion of an injector during molecular ionization and disintegration using a plasma source or other extremely high heat source.

SUMMARY OF INVENTION

Accordingly, the present invention is directed to an apparatus for shielding an injector from heat generated by an inductively coupled plasma mass spectrometer.

In accordance with a first aspect of the present invention, a mass spectrometry injection apparatus comprises an injector body, an injection tube coupled to the injector body and a shielding assembly. The shielding assembly is positioned substantially between the injector body and a plasma source, and is suitable for preventing heat generated from the plasma source from eroding the injector body.

In accordance with a second aspect of the present invention, a mass spectrometry injection system for shielding an injector assembly from plasma source generated heat comprises an injection assembly further comprising an injector body, an injection tube coupled to the injector body and a shielding apparatus disposed between an exposed portion of the injection tube and the injector body, and a torch assembly comprising at least a first open end and a second open end. The injection assembly is suitable for insertion into the first open end of the torch assembly and a plasma source to be directed at the injection assembly through the second open end of the torch assembly. The shielding assembly is suitable for preventing heat generated from a plasma source from eroding the injector body when the injection apparatus is inserted into the torch assembly It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF DRAWINGS

The numerous objects and advantages of the present invention may be better understood by those skilled in the art by reference to the accompanying figures in which.

DETAILED DESCRIPTION OF INVENTION

Reference will now be made in detail to the presently preferred embodiments of the invention, examples of which are illustrated in the accompanying drawings.

Figure 1:
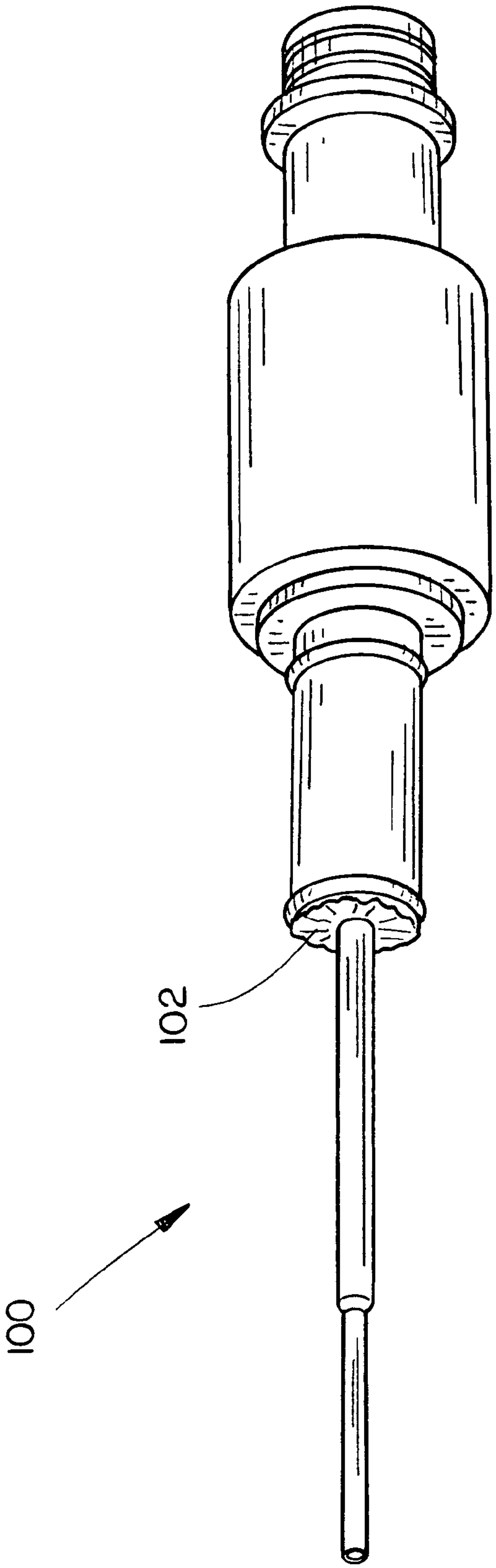
FIG. 1. is an isometric view of a heat eroded injection assembly.
Figure 2:
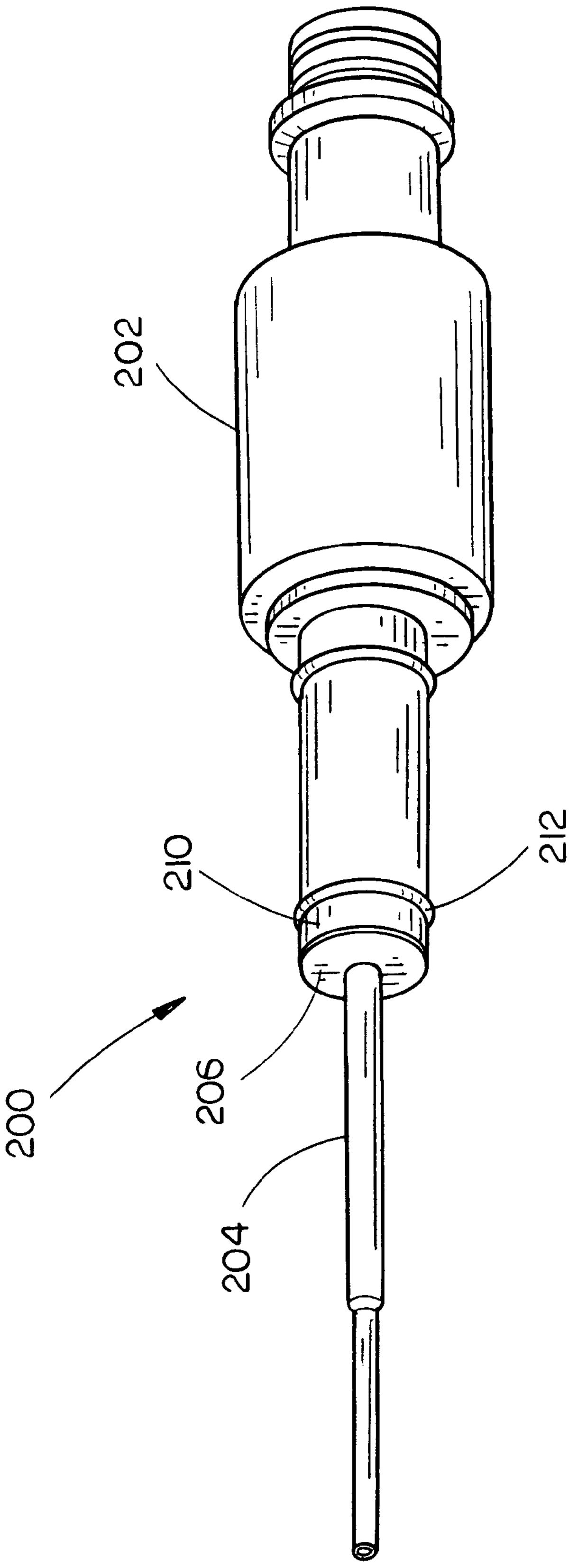
FIG. 2 is an isometric view of an injection apparatus in accordance with various exemplary embodiments of the present invention.

Referring to FIG. 2, an isometric view of an injection apparatus 200 in accordance with various exemplary embodiments of the present invention is shown. Injection apparatus 200 may comprise an injector body 202, an injection tube 204 coupled to the injector body 202. Injection apparatus 200 may further comprise a shielding assembly 206. The shielding assembly 206 is positioned substantially between the injector body 202 and a plasma source, and is suitable for preventing heat generated from the plasma source from eroding the injector body 202.

Injector body 202 may comprise a body member formed about a longitudinal axis and having a bore formed therein. Injector body may be any injector body known in the art suitable for transporting a sample therethrough. Injector body 202 preferably comprises polytetrafluoroethylene (Teflon), or any like highly-resistant plastic, or substance that is nonreactive to physiological or chemical influences. It should be appreciated by those skilled in the art that the injector body 202 may comprise other materials such as for example, any ceramic, any metal or any high temperature resistant plastics without departing from the scope of the present invention.

Injector body 202 may further comprise at least one female threaded section 212 suitable for insertion of an o-ring. O-ring is disposed within a smooth surface of female threaded section 212. O-ring may reduce vibrations and sudden movements of the injector body when inserted into a torch assembly, and may provide a secure fit of the injector body within the torch assembly. Injector body 202 may comprise an aperture running the entire longitudinal length of the injector body 202. In this manner, a sample may be introduced substantially through the injector body 202, the injection tube 204, and into the torch assembly for molecular excitation from the plasma source. Alternatively, injection apparatus may be o-ring free.

Injection tube 204 may be a metallic injection tube 204 extending along the longitudinal axis and terminating at a selected position within the injector body 202 downstream of a resonant cavity coupling microwave energy to the introduced plasma gas. Injection tube 204 may be a containment tube received within and extending from the bore of the injector body. The injection tube 204 may comprise an outside diameter less than that of the inside diameter of said injection tube 204 and connectable to a source of analyte.

Injection tube 204 may be comprised of platinum, nickel, tantalum, titanium or any material having a high purity and that is highly corrosive resistant. In a preferred embodiment, injection tube 204 may be a high purity inert platinum injection tube 204 suitable for reducing contamination from the injection apparatus. Injection tube 204 may also be composed of quartz, sapphire, or like materials suitable for high purity, low background spectrometry applications. Injection tube 204 material may or may not be hydrofluoric acid (HF) resistant.

A shielding assembly 206 may be disposed between a lateral edge of the injector body 202 and an end portion of the injection tube 204 coupled to the injector body 202. In one embodiment, shielding assembly 206 comprises a central aperture having a diameter at least as wide as the widest portion of the injection tube 204. In this manner, shielding assembly 206 may be fitted onto conventional injector apparatuses. For instance, injection tube 204 may be inserted substantially through shielding assembly aperture 214 and shielding assembly 206 may slide along an axis of the injection tube 204 until a first side of the shielding assembly 206 contacts a lateral edge of the injector body 202. Shielding assembly 206 may be pushed down the injection tube 204 manually or via a cap assembly positioned along a second side of the shielding assembly 206 suitable for receiving manual or electronic force substantial to push the shielding assembly 206 along the injection tube 204 to a desired stopping point. Shielding assembly 206 may be removably or permanently coupled to the injector body 202.

In one embodiment, shielding assembly 206 may be a substantially flat disc composed of any heat resistant material. Heat resistant material may also be heat deflecting, suitable for directing heat given off from the plasma source substantially away from the injector body 202. In an alternative embodiment, shielding assembly may be a shielding cap 208. Shielding cap may be fitted substantially over a flat end portion 210 of the injector body 202.

Shielding assembly 206 may be composed of platinum, nickel, tantalum, titanium platinum, ceramic, nickel, or any material that is highly corrosive resistant and suitable for shielding the injector body 202 from the plasma source generated heat. Shielding assembly 206 may be suitable for fitting substantially against a flat end portion 210 of the injector body 202. In this manner, shielding assembly 206 may be prevented from shifting. Alternatively, shielding assembly 206 may be placed anywhere along the injection tube 204 as desired. The shielding assembly 206 may be permanently coupled to the flat end portion 210 of the injector body 202, or may be removably coupled to the flat end portion 210 of the injector body 202. In at least one embodiment, the shielding assembly 206 may be a disc having a surface area not more than the surface area of the flat end portion 210 of the injector body 202. In additional embodiments, the shielding assembly 206 may be a cap suitable for fitting over the flat end portion 210 of the injector body 202. Shielding assembly 206 may be guided substantially along the injection tube 204 via a guiding assembly 308. Guiding assembly 308 may comprise a bore formed substantially through the center of the guiding assembly 308 suitable through which the injection tube 204 may be inserted after the injection tube 204 is inserted through the shielding assembly 206. Guiding assembly 308 may provide additional force and direction guidance for the shielding assembly 206 along the axis of the injection tube, as well as ensure the shielding assembly is substantially flush against the flat end portion 210 of the injector body 202.

Figure 3:
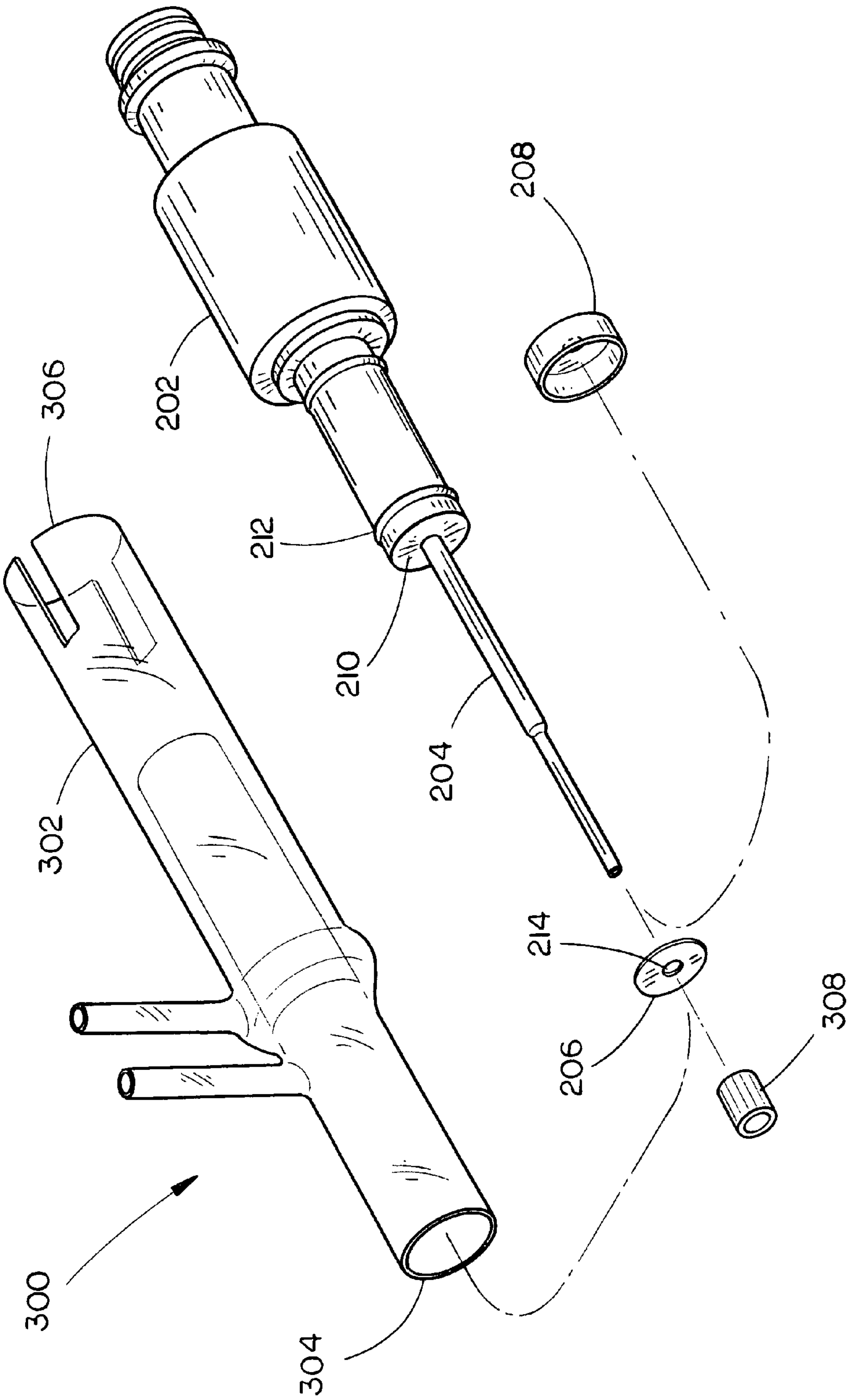
FIG. 3 is an isometric view illustrating the individual components of an injection system in accordance with various exemplary embodiments of the present invention.
Figure 4:
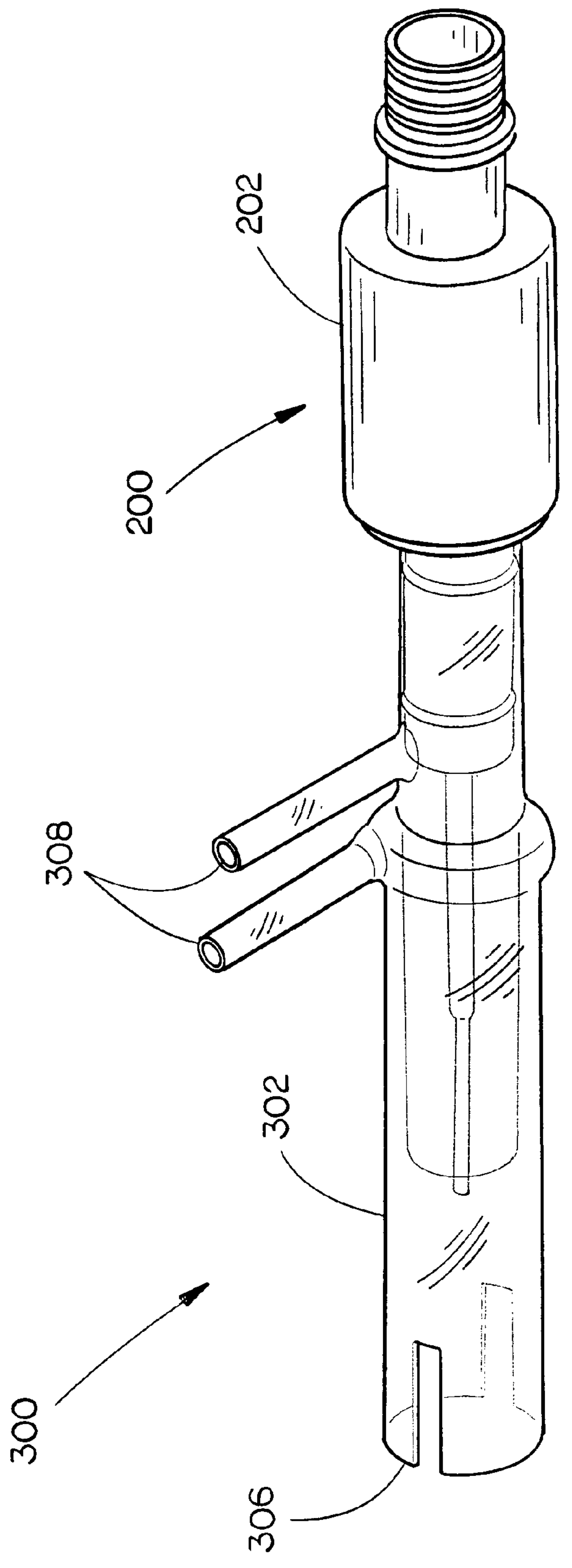
FIG. 4 is an isometric view of an injection system wherein an injection apparatus is inserted into a torch assembly in accordance with various exemplary embodiments of the present invention.

Referring to FIGS. 3 and 4, isometric views of an injection system 300 in accordance with various embodiments of the present invention are shown. FIG. 3 is an isometric view illustrating the individual components of an injection system 300 in accordance with various exemplary embodiments of the present invention. FIG. 4 is an isometric view of an injection system 300 wherein the injection apparatus 200 is inserted into the torch assembly 302 in accordance with various exemplary embodiments of the present invention. System 300 comprises an injection apparatus 200 further comprising an injector body 202, an injection tube 204 coupled to the injector body 202 and a shielding assembly 206 disposed between an exposed portion of the injection tube 204 and the injector body 202. System 300 also comprises a torch further comprising at least a first open end and a second open end 306. The injection apparatus 200 is suitable for insertion into the first open end 304 of the torch and a plasma source to be directed at the injection assembly via the second open end 306 of the torch. The shielding assembly 206 is suitable for shielding the injector body 202 from heat generated by the plasma source. System 300 may prevent or substantially reduce erosion of an injector assembly from plasma source generated heat.

Torch assembly 302 may be suitable for introducing high-boiling point gaseous molecules into inductively-coupled plasma. In one embodiment, torch assembly 302 may effectively introduce all of the high-boiling point gaseous molecules provided from a high-temperature source such as a gas chromatograph (GC), a thermal cracking furnace (pyrolyzer), or a thermogravimetric device (TG), that is, gaseous molecules of high-boiling point sample to be analyzed, into the center part of inductively-coupled plasma (ICP) without cooling and condensing the high-boiling point gaseous molecules when the high-boiling point gaseous molecules are analyzed by an inductively-coupled plasma emission spectrometry (ICP-ES) or an inductively-coupled plasma mass spectrometry (ICP-MS). Torch assembly 302 may be coupled to a plasma introducing assembly for introducing plasma gas into the torch to establish a tangential gas flow in the interior of the torch assembly 302. The torch assembly 302 may be coupled to the plasma introducing assembly utilizing any known means.

Micro particles may be injected into the torch assembly 302. As is well known, the plasma supplies heat to atomize anything in the sample stream and also provides free electrons to ionize the atoms of the micro particles. The torch assembly 302 may comprise at least two concentric tubes. For instance, torch assembly 302 may comprise an outer quartz tube and an inner quartz tube. Concentric tubes may provide outer flows of argon or other inert gas, as is conventional, to improve the characteristics of the plasma to be formed and to cool the walls of the torch assembly 302. Concentric tubes may receive their argon from sources which direct argon into the concentric tubes in known manner. Further, the outer quartz tube contains the plasma generated by an induction coil encircling the inner quartz tube. Such torch assemblies are well known. Plasma may also be generated utilizing microwaves or another suitable energy source.

Torch assembly 302 may further comprise a plurality of discharge tubes. Discharge tubes may be suitable for discharging gas from the torch. It is further contemplated that torch assembly 302 may be a semi-demountable torch assembly 302.

It is believed that the present invention and many of its attendant advantages will be understood by the foregoing description. It is also believed that it will be apparent that various changes may be made in size, materials, shape, form, function, manner of operation, assembly and use of the components thereof without departing from the scope and spirit of the invention or without sacrificing all of its material advantages. The form herein before described being merely an explanatory embodiment thereof. Further, it is contemplated that the specific order or hierarchy of steps in the method can be rearranged while remaining within the scope and spirit of the present invention. It is the intention of the following claims to encompass and include such changes.

What is claimed is:

1. An apparatus for use in mass spectrometry comprising:
- a plastic injector body;
- a sample injection tube coupled to the plastic injector body, at least a portion of the sample injection tube is configured for insertion into a torch assembly; and
- a substantially flat disc shaped heat resistant and corrosive resistant shielding assembly disposed between the plastic injector body and the sample injection tube, the shielding assembly further including a small centrally disposed aperture,
- the substantially flat disc shaped heat resistant and corrosive resistant shielding assembly for shielding the plastic injector body from heat generated by a plasma source, the substantially flat disc shaped heat resistant and corrosive resistant shielding assembly further disposed to be substantially flush against a flat end portion of the plastic injector body.

2. The apparatus of claim 1, the sample injection tube for insertion through the small centrally disposed aperture.

3. The apparatus of claim 1, wherein the substantially flat disc shaped heat resistant and corrosive resistant shielding assembly is composed of a metal or a metal alloy.

4. The apparatus of claim 3, wherein the metal or metal alloy is at least one of platinum, nickel, tantalum, or titanium.

5. The apparatus of claim 1, wherein the substantially flat disc shaped heat resistant and corrosive resistant shielding assembly is composed of a ceramic.

6. The apparatus of claim 1, wherein the substantially flat disc shaped heat resistant and corrosive resistant shielding assembly is permanently coupled to the flat end portion of the plastic injector body.

7. The apparatus of claim 1, wherein the substantially flat disc shaped heat resistant and corrosive resistant shielding assembly is removably coupled to the flat end portion of the plastic injector body.

8. The apparatus of claim 1, wherein the substantially flat disc shaped heat resistant and corrosive resistant shielding assembly has a surface area not more than the surface area of the flat end portion of the plastic injector body.

9. A system for use in mass spectrometry comprising:
- an injection assembly, the injection assembly further comprising:
- a plastic injector body;
- a sample injection tube coupled to the plastic injector body; and
- a flat disc shaped shielding assembly disposed between the plastic injector body and the sample injection tube; and
- a torch assembly comprising at least two concentric tubes;
- wherein at least a portion of the sample injection tube is positioned within an interior of the at least two concentric tubes when the injection assembly is inserted into the torch assembly, the torch assembly for coupling with a plasma source and the flat disc shaped shielding assembly for shielding the plastic injector body from heat generated by the plasma source.

10. The system of claim 9, wherein the flat disc shaped shielding assembly further comprises a centrally disposed aperture and the sample injection tube for insertion through the centrally disposed aperture.

11. The system of claim 9, wherein the flat disc shaped shielding assembly is composed of a metal or a metal alloy.

12. The system of claim 11, wherein the metal or metal alloy is at least one of platinum, nickel, tantalum, or titanium.

13. The system of claim 9, wherein the flat disc shaped shielding assembly is composed of a ceramic.

14. The system of claim 9, wherein the plastic injector body comprises a flat end portion.

15. The system of claim 14, wherein the flat disc shaped shielding assembly is permanently coupled to the flat end portion of the plastic injector body.

16. The system of claim 14, wherein the flat disc shaped shielding assembly is removably coupled to the flat end portion of the plastic injector body.

17. The system of claim 9, wherein the flat disc shaped shielding assembly has a surface area not more than the surface area of the flat end portion of the plastic injector body.

18. The system of claim 9, wherein the flat disc shaped shielding assembly is a cap for fitting over the flat end portion of the plastic injector body.

* * * * *